(12) United States Patent
Bober

(10) Patent No.: US 8,099,309 B1
(45) Date of Patent: Jan. 17, 2012

(54) FINANCIAL POLICY CHANGE ADVISOR

(75) Inventor: Paul M. Bober, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 1262 days.

(21) Appl. No.: 11/474,716

(22) Filed: Jun. 26, 2006

(51) Int. Cl.
*G06Q 40/00* (2006.01)
(52) U.S. Cl. ...................... 705/7.11; 705/7.12
(58) Field of Classification Search .............. 705/10
See application file for complete search history.

(56) References Cited

U.S. PATENT DOCUMENTS

| 7,287,016 | B2* | 10/2007 | Johnson et al. | 706/47 |
| 7,693,760 | B1* | 4/2010 | Fiteni et al. | 705/31 |
| 2002/0107698 | A1* | 8/2002 | Brown et al. | 705/1 |
| 2002/0198805 | A1* | 12/2002 | Burkhardt | 705/35 |
| 2003/0139827 | A1* | 7/2003 | Phelps | 700/36 |
| 2003/0195780 | A1* | 10/2003 | Arora et al. | 705/7 |

* cited by examiner

*Primary Examiner* — Thomas Dixon
*Assistant Examiner* — Benjamin S Fields
(74) *Attorney, Agent, or Firm* — Osha • Liang LLP

(57) ABSTRACT

The invention relates to a computer implemented method of estimating a first financial outcome. The computer implemented method involves obtaining financial data associated with an entity, selecting a first proposed financial policy impacting the entity, applying the first proposed financial policy to the financial data to estimate the first financial outcome, and presenting the first financial outcome to the entity.

34 Claims, 5 Drawing Sheets

FINANCIAL POLICY CHANGE ADVISOR

BACKGROUND

The financial world is constantly changing. These changes are often triggered by financial policy changes. The financial policy changes are typically made by enacting legislation in the form of code, regulations, and/or rules. These changes often have a direct financial impact on households and businesses.

Today, the economic impact from a proposed financial policy change is not well understood and only approximated for aggregate impacts on a broad base population. Thus, the full impact on a particular household or business is not known. As a result, special interest groups often present arguments to persuade a household for or against the proposed policy change. These arguments cannot be refuted because the calculations on full financial impact on specific individuals, businesses, or households are not performed. Thus, speculation governs the decision of whether to support a proposed financial policy.

In an attempt to describe the impact of a change, computerized financial programs for electronically processing financial scenarios and making projections are used. Financial programs today handle the variability of changed inputs as well as the calculation of corresponding model outputs or scenario calculation outcomes.

However, for the reasons described above, these model outputs or scenario outcomes are generalized for an "average" or "median" household (or business) or an "assumed" household (or business) based on a "typical" criteria. For example, when a proposed piece of legislation affecting a financial policy is being debated, the proponents and opponents of the legislation are armed with model outputs and/or scenario calculation outcomes regarding the purported impact of legislation on the "average" or "typical" household (e.g., the tax bill will cost the average household $50/week, the tax cut will save each household with two children $250/year, etc.). This information may then be used as part of a publicity campaign to either elicit support for the proposal or attack the proposal. A specific household, business, or individual viewing this information is unsure of the specific impact the proposed financial policy change will have on their situation, which will ultimately influence their decision to support or oppose the proposal(s).

SUMMARY

In general, in one embodiment, the invention relates to a computer implemented method of estimating a first financial outcome. The computer implemented method comprises obtaining financial data associated with an entity, selecting a first proposed financial policy impacting the entity, applying the first proposed financial policy to the financial data to estimate the first financial outcome, and presenting the first financial outcome to the entity.

In general, in one embodiment, the invention relates to a computer readable medium containing instructions to estimate a first financial outcome. The instructions comprise functionality to obtain financial data associated with an entity, select a first proposed financial policy impacting the entity, apply the first proposed financial policy to the financial data to estimate the first financial outcome, and present the first financial outcome to the entity.

In general, in one embodiment, the invention relates to a system for estimating a first financial outcome. The system comprises a financial data acquisition module configured to obtain financial data associated with an entity, a financial policy acquisition module configured to obtain a first proposed financial policy impacting the entity, a financial simulator module operatively connected to both the financial data acquisition module and the financial policy acquisition module and configured for applying the first proposed financial policy to the financial data to estimate the first financial outcome, and a financial comparison module configured to present the first financial outcome to the entity.

Other aspects of the invention will be apparent from the following description and the appended claims.

DETAILED DESCRIPTION

Figure 1:
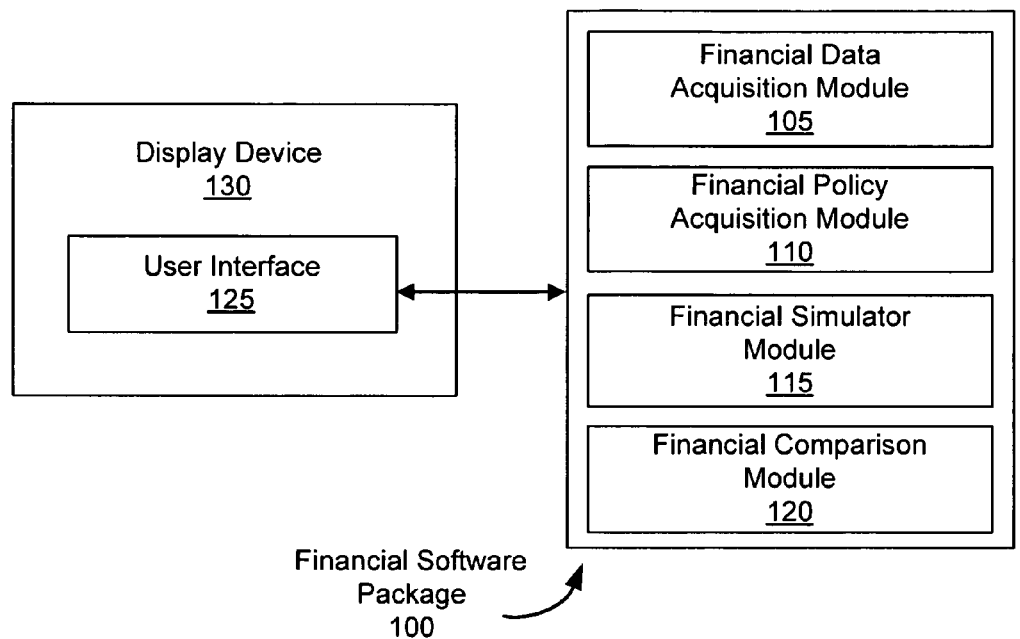
FIG. 1 shows a block diagram of interface components of a financial software program in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a computer implemented method and system to estimate a financial outcome based on the impact of one or more proposed financial policies on actual financial data. Further, the financial outcome is presented in some meaningful form to a user.

FIG. 1 shows a block diagram of interface components of a financial software program in accordance with one or more embodiments of the invention. In one or more embodiments of the invention, the financial software package (100) may be a personal financial package, a business financial package, a tax preparation package, or any other similar financial package that includes a user interface (125) allowing a user to access and receive information from the financial software package (100). The user interface (125) may be configured to allow data transfer in textual and/or graphical form between the financial software package (100) to a display device (130) (e.g., a monitor, a printer, a screen on a mobile computing device, etc.). One skilled in the art will appreciate that the user interface (125) may be part of the financial software package (100), part of an independent software package, a web interface, or any similar configuration whether across a network or otherwise.

In one or more embodiments of the invention, the financial software package (100) includes components to estimate a financial outcome, such as a financial data acquisition module (105), a financial policy acquisition module (110), a financial simulator module (115), and a financial comparison module (120). Each of these components may be embodied as a function of the financial software package (100). Each module is described in detail below.

In one or more embodiments of the invention, the financial data acquisition module (105) acquires data from a user. The data may include all financial data of an entity (e.g., business, household, individual, etc.) or just a portion of the financial data that is related to the proposed financial policy. For example, if the proposed financial policy relates to a tax credit for a natural disaster, then only data relating to the natural disaster (i.e., where property was located on the date of the natural disaster, the value of the property before and after the date of the natural disaster, expenses related to the natural disaster after the date of the disaster) is selected to be acquired.

The data may be acquired by the financial data acquisition module (105) using the user interface (125). Specifically, the user may input the data manually, select and import a stored file, etc. using the user interface (125). The acquired financial data may be stored in any form recognized by the financial software package (100). For example, the financial data may be in a spreadsheet, as a tab- or comma-delimited file, an exchange format of personal financial program (e.g., Open Financial Exchange (OFX)). Further, the financial data may be parsed to verify its compatibility for acquisition and use by the financial software package (100). In one or more embodiments of the invention, the financial software package (100) includes business logic to translate the financial data to a compatible format in a manner known to those skilled in the art. Further, the financial data acquisition module (105) may generate financial data using existing, stored financial data (i.e., historical data) or other data within the financial software package. For example, the prior year(s) stored tax data for the entity may be retrieved and manipulated (e.g., multiplied by a percentage factor, adjusted by a specific amount, etc.) to estimate "current" financial data. Once obtained, the financial data acquisition module (105) forwards the information (i.e., one or more sets of financial data) to the financial simulator module (115) for processing.

In one or more embodiments of the invention, the financial policy acquisition module (110) acquires one or more financial policies in a similar fashion as the financial data. Specifically, the user may enter the financial policy (or data associated with the financial policy) manually or may be selected and imported as a stored file, etc. using the user interface (125). Most commonly, the financial policy is obtained from a governmental entity (e.g., a national, state, or municipal governmental body), a politician, a political action committee, a lobbyist, the media, or any other similar third-party entity using a website or similar functionality. Further, the financial policy may be parsed to verify its compatibility for acquisition and use by the financial software package (100). In one or more embodiments of the invention, the financial software package (100) includes business logic to translate the financial policy to a compatible format in a manner known to those skilled in the art. Once obtained, the financial policy acquisition module (110) forwards one or more financial policies to the financial simulator module (115) for processing.

In one or more embodiments of the invention, the financial simulator module (115) simulates the affect on the entity of a change in the financial policy. In one or more embodiments of the invention, the financial simulator module (115) is connected to both the financial data acquisition module (105) and the financial policy acquisition module (110). Further, the financial simulator module (115) accepts as input one or more sets of financial data and one or more financial policies to be evaluated.

In one or more embodiments of the invention, the financial simulator module (115) includes functionality to apply one or more proposed financial policies to one or more of the financial data sets to estimate a financial outcome. Specifically, each financial policy is analyzed and business logic is generated such that it captures rules embodied by the financial policy. In one or more embodiments of the invention, the business logic capturing the rules of the financial policy is generated automatically by analyzing the text of the financial policy using techniques well known in the art to convert textual rules directly to business logic, see, e.g., U.S. patent application Ser. No. 11/385,319, entitled "AUTOMATIC CODE GENERATION VIA NATURAL LANGUAGE PROCESSING" filed on Mar. 20, 2006; which is hereby incorporated by reference.

Next, one or more sets of financial data is applied to the business logic that captures the rules embodied by a financial policy. The result of applying the business logic to the financial data is an estimated financial outcome for the entity associated with the financial data. Further, multiple financial policies may be applied to a set of data producing an estimated financial outcome for each of the financial policies. Similarly, a single financial policy may be applied to multiple sets of data producing an estimated financial outcome for each set of data.

In one or more embodiments of the invention, a financial comparison module (120) present the financial outcome to the user and may, if two or more financial outcomes are available, compare the various financial outcomes. For example, if a single financial outcome is estimated, then the single financial outcome may compared to historical data from a comparable time period (e.g., previous year, previous two years, previous quarter, the same quarter from the prior year, previous month, same month from prior year, etc.). If multiple financial outcomes are estimated (as described above), then the multiple financial outcomes can be compared directly. For example, the same financial policy using different sets of financial data or different financial policies using the same set of financial data may be compared to determine the possible financial impact on the entity.

Additionally, in one or more embodiments of the invention, a cumulative financial impact may be compared by combining various consistent financial outcomes to determine the financial impact on an entity if several proposed financial policies take effect. For example, if two tax bills are pending, one which includes a decrease in property tax and one which includes an increase in sales tax, the entity could determine the cumulative effect if both bills are passed.

In one or more embodiments of the invention, the financial outcome may be presented to the user in a textual, tabular, and/or graphical manner. For example, a report may be generated with a detailed accounting of the impact of the proposed financial policy on the entity. Data may be presented to compare the cost of the proposed financial policy in the current year to past and/or projected future years. In one or more embodiments of the invention, the data presentation is in the form of a graphical representation (e.g., a pie graph, table, and/or a histogram). The preceding examples are provided for illustrative purposes only and one skilled in the art will appreciate that any means of data presentation that is useful to the user (and/or the entity) may be used in accordance with one or more embodiments of the invention.

One skilled in the art will appreciate that while the financial software package (100), as shown in FIG. 1 and described above, has four modules, the financial software package (100) may have more or less modules and the organization and/or functionality of the various modules may vary depending on the implementation chosen (i.e., the financial simulator module (115) may include functionality to perform a comparison, so the financial comparison module (120) may not be necessary).

Figure 2:
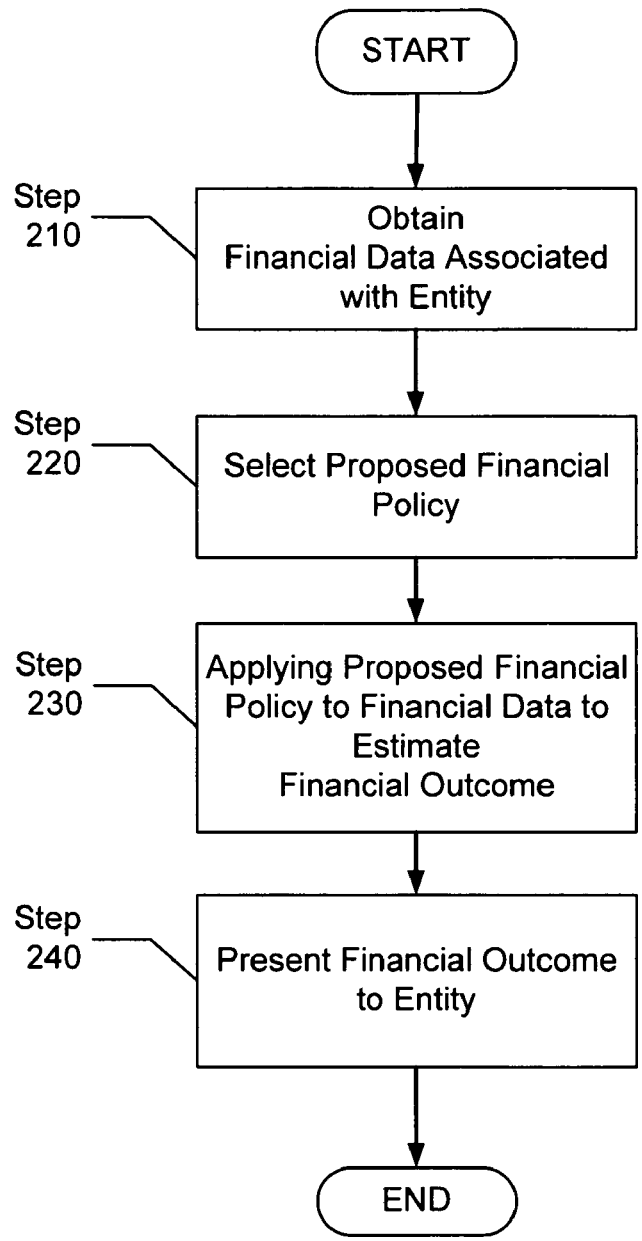
FIGS. 2 and 3 show flow diagrams for estimating the impact of a financial policy change in accordance with one or more embodiments of the invention.

FIG. 2 shows a flow diagram for estimating the impact of a financial policy change in accordance with one or more embodiments of the invention. Specifically, FIG. 2 shows a method of using the system shown in FIG. 1.

Initially, financial data associated with an entity is obtained (Step 210). As discussed above in relation to the financial data acquisition module (105 in FIG. 1), the financial data is obtained either manually or by selecting and importing the data as a stored file. The financial data may be historical (i.e., actual data from a time period prior to obtaining the data) or estimated (i.e., projected data based on trends, budgeted data, hypothetical data for a particular scenario of interest, etc.). The obtained financial data may represent the complete financial picture for the entity or, more likely, data associated with a selected, potentially impacted portion of the entity. Accordingly, in one or more embodiments of the invention, obtaining the financial data of the entity may involve selecting the relevant data of the entity based on the proposed financial policy.

Because financial software programs are diverse, generally many input variables are necessary where the data associated with the variables are required to be in a format or structure recognized by the software financial program or in compliance with a standard format (i.e., OFX). Thus, a set of financial data must be capable of being parsed to verify its compatibility for acquisition and use by the financial software package.

Next, one or more proposed financial policies are selected (Step 220). Typically, the financial policy is based on proposed legislation of a governmental entity, such as a bill being debated by a state or federal legislature, a proposed rule suggested by a governmental agency, or other similar proposed policies of other similar rule-making bodies. In one or more embodiments of the invention, the proposed financial policy relates to taxation legislation (whether international, federal, or state) and specifically legislation affecting a current tax code, rule, and/or regulation.

In one or more embodiments of the invention, the financial policy may be accessed and/or selected from a website operated by one or more of the aforementioned governmental entities/rule-making bodies. Further, the proposed financial policy (or policies) selected are chosen because the entity has an interest in how the policy (or policies) will affect the specific entity if the policy change occurs. Instead of evaluating a policy based on the financial outcome to an "average" or "standard" perspective, the entity is able to determine the actual financial outcome based on the data obtained from the entity. In one or more embodiments of the invention, the data associated with the financial policy must be capable of being parsed to verify its compatibility for acquisition and use by the financial software package.

Once the financial data is obtained and the financial policy (or policies) is selected, the financial policy (or policies) is applied to financial data to estimate a financial outcome (Step 230). Specifically, each financial policy is analyzed and business logic is generated that captures rules embodied by the financial policy in a similar manner as discussed in relation to the financial simulation module (115) described and shown in FIG. 1 above. Generating such business logic defining the rules embodied by the financial policy is known in the art. Further, the manner of accepting the obtained financial data as input is also known in the art. However, applying the obtained, actual financial data of the entity to the rules embodied by the financial policy results in outputting an estimate (i.e., an accurate reflection) of the financial outcome for the particular entity, which enables the entity to determine whether to support the proposed financial policy.

Continuing with FIG. 2, the financial outcome produced in Step 230 is presented to the entity (Step 240). The financial outcome may be presented as a single monetary amount representing the financial impact of one or more proposed financial policies. For example, if a single financial policy is selected and current financial data of the entity is used, then an outcome can be calculated as an actual monetary amount (e.g., save 500 dollars, cost 300 dollars, etc.). Similarly, if multiple financial policies are selected and applied to financial data of the entity, then a cumulative financial outcome can be calculated, as shown and described in FIG. 3 below. However, if multiple sets of disparate financial data are applied to one or more financial policies, then the information may be presented as a comparison of the various economic outcomes. Likewise, if only a single financial outcome is calculated, then the financial outcome may be compared to historical data (if available) for a similar time span.

In one or more embodiments of the invention, the data may be presented in a table, a chart, a scatter diagram, a pie graph, a histogram, a bar graph, or other similar textual, tabular, or graphical representations. One skilled in the art will appreciate that the presentation of the data associated with the financial outcome may be take on various different forms and may be presented to a variety of persons within the entity depending on the needs or desires of that person or the nature of the financial policy.

In one or more embodiments of the invention, the financial outcome may be affected differently by financial policy changes as a result of jurisdictional boundaries and/or the entity parameters (e.g., location, size, citizenship, type (i.e., profit, non-profit, governmental), etc.). Specifically, the financial outcome and the financial policy may be associated with a different entity parameter. For example, entities (either a person or business) that are citizens of one country may also be subject to the foreign rules when living or operating abroad. Accordingly, the impact and financial outcome of the entity is determined by a financial policy of a separate location. Similarly, the size (i.e., number of dependents, under one million dollars in revenue, under 50 employees, etc.) of an entity in one jurisdiction may change how the entity is designated (i.e., large family, small business, etc.) and, therefore, the financial outcome is changed based on a different entity parameter.

Figure 3:
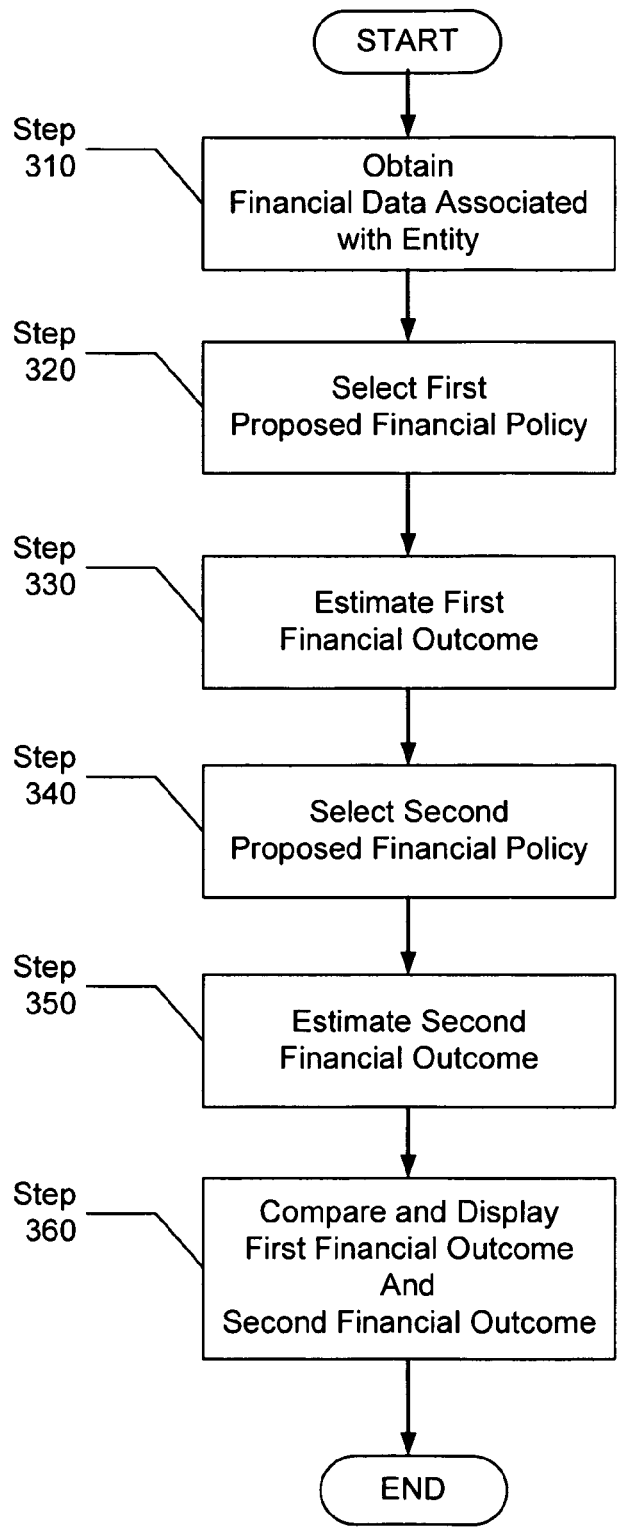

FIG. 3 shows a flow diagram for estimating the impact of a financial policy change in accordance with one or more embodiments of the invention. Specifically, FIG. 3 shows a method of comparing financial outcomes. The financial outcomes may vary depending on the financial data obtained and/or the proposed financial policy or policies chosen. Step 310 involves obtaining financial data associated with an entity, which is performed in substantially the same manner as described above and shown in Step 210 of FIG. 2. Next, a first proposed financial policy is selected (Step 320). A first financial outcome is estimated (Step 330) by applying the financial data to the first proposed financial policy in a substantially similar manner, as described above and shown in Step 230 of FIG. 2. Similarly, a second proposed financial policy is selected (Step 340) and a second financial outcome is estimated (Step 350). Finally, the first financial outcome and the second financial outcome are compared and displayed (Step 360). One skilled in the art will appreciate that while the method has been described using a specific number of steps and in a particular order, the method may be performed with more or less steps and in a different order.

Figure 4A:
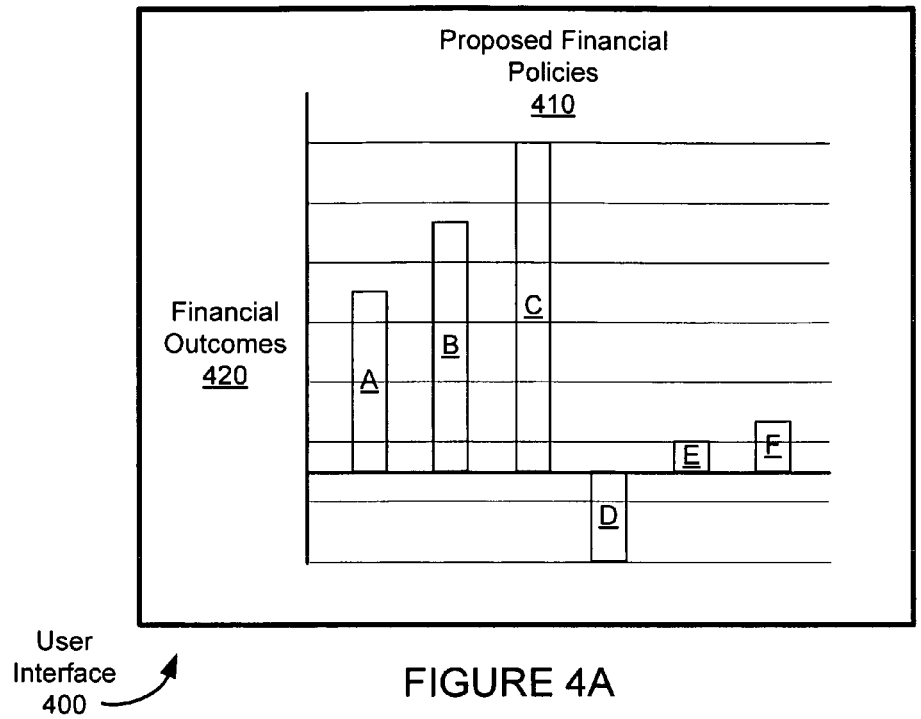
FIGS. 4A and 4B show displays of comparisons within an interface of a financial software program in accordance with one or more embodiments of the invention.
Figure 4B:
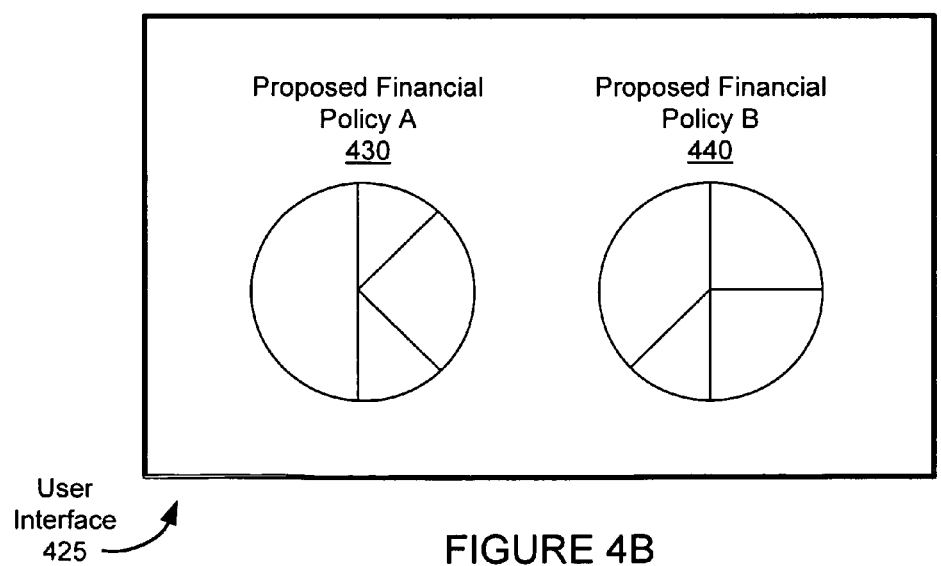

FIGS. 4A and 4B show displays of comparisons within an interface of a financial software program in accordance with one or more embodiments of the invention. Specifically, each display is intended to be a representation of a user interface used to present data associated with the financial outcome of one or more proposed financial policies. However, these displays are not intended to limit the type of presentation of data used by the financial software program and are merely illustrative in purpose.

FIG. 4A shows a user interface (400) with a bar graph displaying the financial outcome (420) corresponding to various proposed financial policies (i.e., A, B, C, D, E, F). In one or more embodiments of the invention, the financial outcome is designated as a monetary value (such as dollars). One skilled in the art will appreciate that any monetary or economic value may be used to designate the financial outcome. Further, one skilled in the art will appreciate that the amount of the financial outcome may be a positive or a negative value.

As shown in FIG. 4A, the financial outcome associated with the various proposed financial policies (i.e., A, B, C, D, E, F) may be displayed within the user interface (400). The number of proposed policies is limited only by the ability to display the chosen number in a clear and visually appealing manner. While not shown in FIG. 4A, one or more of the proposed financial policies (i.e., A, B, C, D, E, F) may be combined to show the cumulative effect of multiple policies.

FIG. 4B shows a user interface (425) displaying two pie graphs representing the financial outcome of two distinct proposed financial policies, namely proposed financial policy A (430) and proposed financial policy B (440). Both proposed financial policy A (430) and proposed financial policy B (440) show pie charts indicating various components that constitute the financial outcome. For instance, proposed financial policy A (430) may have a negative financial outcome that includes an increase in a capital gains tax component, an increase in an alternative minimum tax component, a reduction in an itemized deduction component, a reduction in a standard deduction component, etc. In contrast, proposed financial policy B (440) may have a positive outcome that includes an increase in the child tax credit, an increase in the personal exemption, an increase in the earned income tax credit, etc. Accordingly, the pie chart is able to quickly and easily present a breakdown of the positive or negative financial outcome to the entity.

Figure 5:
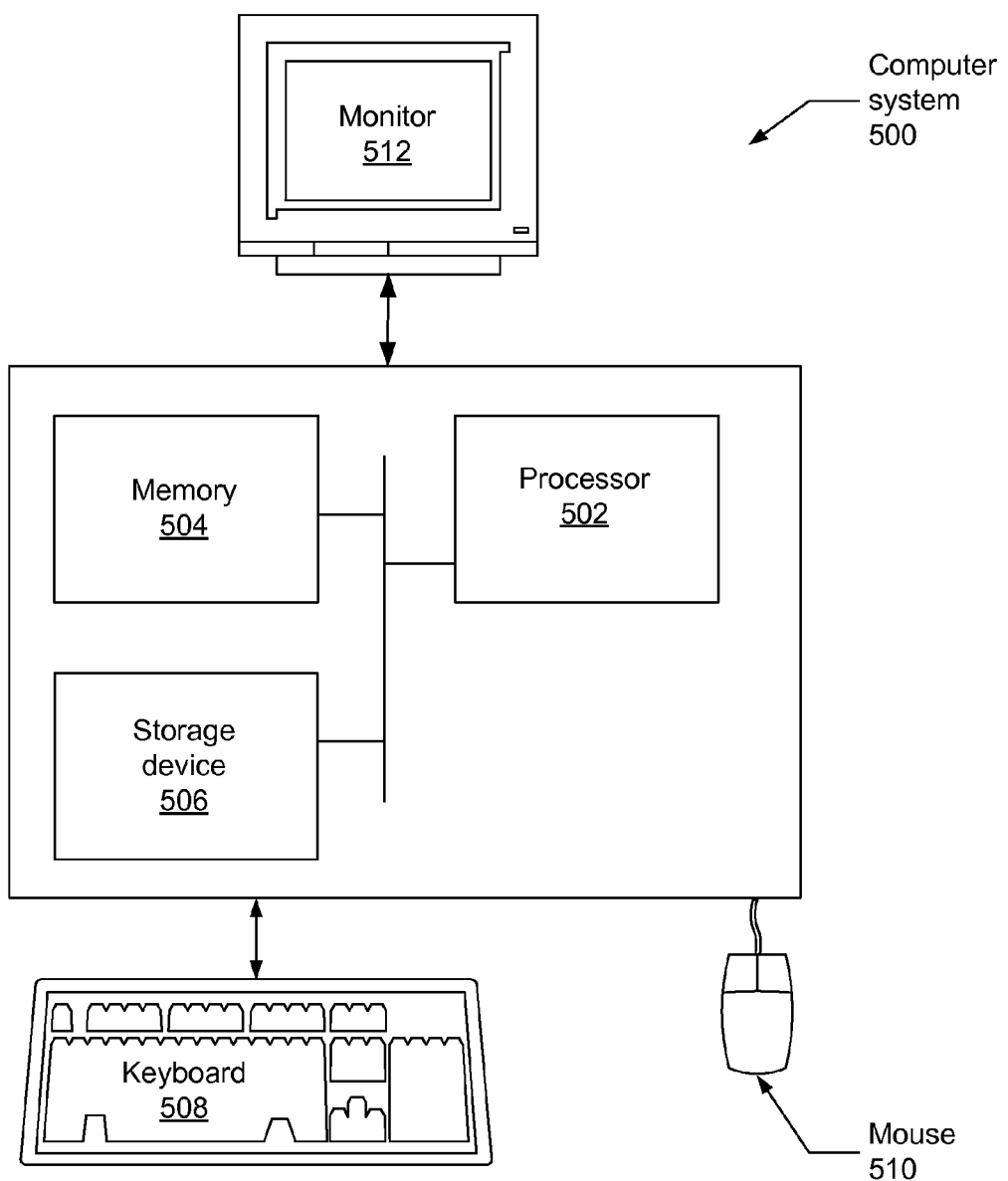
FIG. 5 shows a computer system in accordance with one or more embodiments of the invention.

The invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer implemented method of estimating a first financial outcome using a financial software package, the method comprising:
    obtaining, using a processor of a computer, financial data for a current tax year from the financial software package associated with an entity to generate stored financial data;
    accessing, from a first website, a first proposed taxation legislation impacting the entity, wherein the first website is operated by a first government body associated with the first proposed taxation legislation;
    applying, using the processor, the first proposed taxation legislation to the stored financial data within the financial software package to estimate the first financial outcome;
    accessing, from a second website, a second proposed taxation legislation impacting the entity, wherein the second website is operated by a second government body associated with the second proposed taxation legislation, and wherein the second proposed taxation legislation is applied to different jurisdictional boundaries than the first proposed taxation legislation;
    applying the second proposed taxation legislation to the stored financial data of the entity to estimate a second financial outcome;
    presenting the first financial outcome and the second financial outcome to the entity; and
    evaluating the first financial outcome with the second financial outcome, wherein the first financial outcome provides support for the entity to oppose the first proposed taxation legislation, and wherein the second financial outcome suggests that the entity support the second proposed taxation legislation.

2. The computer implemented method of claim 1, wherein the first proposed taxation legislation comprises at least one selected from a group consisting of a code, a rule, and a regulation.

3. The computer implemented method of claim 1, wherein the entity comprises at least one selected from a group consisting of an individual, a household, and a business.

4. The computer implemented method of claim 1, further comprising:
    obtaining a historical financial outcome using the stored financial data; and
    comparing the first financial outcome with the historical financial outcome.

5. The computer implemented method of claim 4, wherein the historical financial outcome and the first proposed taxation legislation are associated with a different entity parameter.

6. The computer implemented method of claim 5, wherein the different entity parameter is location.

7. The computer implemented method of claim 4, wherein presenting the first financial outcome to the entity comprises:
generating a data presentation within a user interface showing a relationship between the historical financial outcome and the first financial outcome.

8. The computer implemented method of claim 1, wherein the first proposed taxation legislation and the second proposed taxation legislation are associated with a different entity parameter.

9. The computer implemented method of claim 8, wherein the different entity parameter is location.

10. The computer implemented method of claim 1, wherein presenting the first financial outcome to the entity comprises:
generating a data presentation within a user interface showing a relationship between the first financial outcome and the second financial outcome.

11. A computer readable medium containing instructions to estimate a first financial outcome using a financial software package, the instructions comprising functionality to:
obtain financial data for a current tax year from the financial software package associated with an entity to generate stored financial data;
access, from a first website, a first proposed taxation legislation impacting the entity, wherein the first website is operated by a first government body associated with the first proposed taxation legislation;
apply the first proposed taxation legislation to the stored financial data using the financial software package to estimate the first financial outcome;
access, from a second website, a second proposed taxation legislation impacting the entity, wherein the second website is operated by a second government body associated with the second proposed taxation legislation, and wherein the second proposed taxation legislation is applied to different jurisdictional boundaries than the first proposed taxation legislation;
apply the second proposed taxation legislation to the stored financial data of the entity to estimate a second financial outcome;
present the first financial outcome and the second financial outcome to the entity; and
evaluate the first financial outcome with the second financial outcome, wherein the first financial outcome provides support for the entity to oppose the first proposed taxation legislation, and wherein the second financial outcome suggests that the entity support the second proposed taxation legislation.

12. The computer readable medium of claim 11, wherein the first proposed taxation legislation comprises at least one selected from a group consisting of a code, a rule, and a regulation.

13. The computer readable medium of claim 11, wherein the entity comprises at least one selected from a group consisting of an individual, a household, and a business.

14. The computer readable medium of claim 11, wherein the instructions further comprise functionality to:
obtain a historical financial outcome using the stored financial data; and
compare the first financial outcome with the historical financial outcome.

15. The computer readable medium of claim 14, wherein the historical financial outcome and the first proposed taxation legislation are associated with a different entity parameter.

16. The computer readable medium of claim 15, wherein the different entity parameter is location.

17. The computer readable medium of claim 14, wherein the instructions comprising functionality to present the first financial outcome to the entity comprises:
generating a data presentation within a user interface showing a relationship between the historical financial outcome and the first financial outcome.

18. The computer readable medium of claim 11, wherein the first proposed taxation legislation and the second proposed taxation legislation are associated with a different entity parameter.

19. The computer readable medium of claim 18, wherein the different entity parameter is location.

20. The computer readable medium of claim 11, wherein the instructions comprising functionality to present the first financial outcome to the entity comprises:
generating a data presentation within a user interface showing a relationship between the first financial outcome and the second financial outcome.

21. A computer system for estimating a first financial outcome comprising: memory; a processor; a financial software package; a financial data acquisition module configured, using the processor, to obtain financial data for a current tax year from the financial software package associated with an entity and store the financial data in the memory to generate stored financial data; a financial policy acquisition module configured to obtain: from a first website, a first proposed taxation legislation impacting the entity and store the first proposed taxation legislation in the memory, wherein the first website is operated by a first government body associated with the first proposed taxation legislation; and from a second website, a second proposed taxation legislation impacting the entity and store the second proposed taxation legislation in the memory, wherein the second website is operated by a second government body associated with the second proposed taxation legislation; a financial simulator module operatively connected to the memory, the financial data acquisition module, and the financial policy acquisition module and configured to: apply, using the processor, the first proposed taxation legislation to the stored financial data within the financial software package to estimate a first financial outcome; and apply, using the processor, the second proposed taxation legislation to the stored financial data within the financial software package to estimate a second financial outcome; and a financial comparison module configured to present the first financial outcome and the second financial outcome to the entity, wherein the first financial outcome provides support for the entity to oppose the proposed taxation legislation, and wherein the second financial outcome suggests that the entity support the second proposed taxation legislation.

22. The computer system of claim 21, further comprising:
an interface to access at least one selected from a group consisting of the financial data acquisition module, the financial policy acquisition module, the financial simulator module, and the financial comparison module.

23. The computer system of claim 21, wherein the financial software package embeds at least the financial simulator module.

24. The computer system of claim 21, wherein the first proposed taxation legislation comprises at least one selected from a group consisting of a code, a rule, and a regulation.

25. The computer system of claim 21, wherein the entity comprises at least one selected from a group consisting of an individual, a household, and a business.

26. The computer implemented method of claim 1, wherein the first proposed taxation legislation is parsed to verify its compatibility for acquisition and use by the financial software package.

27. The computer readable medium of claim 11, wherein the first proposed taxation legislation is parsed to verify its compatibility for acquisition and use by the financial software package.

28. The computer system of claim 21, wherein the financial policy acquisition module is further configured to parse the first proposed taxation legislation to verify its compatibility for acquisition and use by the financial software package.

29. The computer implemented method of claim 1, wherein the first financial outcome comprises a plurality of components, wherein each of the plurality of components describes a particular financial effect on the entity.

30. The computer implemented method of claim 29, wherein each of the plurality of components is presented on a graphical display.

31. The computer readable medium of claim 11, wherein the first financial outcome comprises a plurality of components, wherein each of the plurality of components describes a particular financial effect on the entity.

32. The computer implemented method of claim 31, wherein each of the plurality of components is presented on a graphical display.

33. The computer system of claim 21, wherein the first financial outcome estimated by the financial simulator module comprises a plurality of components, wherein each of the plurality of components describes a particular financial effect on the entity.

34. The computer system of claim 22, wherein each of the plurality of components is presented on a graphical display on the financial comparison module.

\* \* \* \* \*